US010340582B2

(12) United States Patent
Kuang et al.

(10) Patent No.: US 10,340,582 B2
(45) Date of Patent: Jul. 2, 2019

(54) METAL FRAME BODY AND TERMINAL INCLUDING SAME

(71) Applicant: Beijing Xiaomi Mobile Software Co., Ltd., Beijing (CN)

(72) Inventors: Wei Kuang, Beijing (CN); Yuchuan Su, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/019,734

(22) Filed: Jun. 27, 2018

(65) Prior Publication Data

US 2019/0006740 A1 Jan. 3, 2019

(30) Foreign Application Priority Data

Jun. 30, 2017 (CN) .......................... 2017 1 0527568

(51) Int. Cl.
*H04M 1/00* (2006.01)
*H01Q 1/24* (2006.01)
*H01Q 13/10* (2006.01)
*G01S 19/36* (2010.01)
*H04M 1/02* (2006.01)
*H01Q 1/22* (2006.01)

(52) U.S. Cl.
CPC ............ *H01Q 1/243* (2013.01); *G01S 19/36* (2013.01); *H01Q 13/10* (2013.01); *H04M 1/026* (2013.01); *H01Q 1/2266* (2013.01); *H04M 1/0249* (2013.01)

(58) Field of Classification Search
CPC ........ H02Q 1/243; G01S 19/36; H04M 1/026; H04M 1/0249; H04M 1/72519; H04M 1/72522; H01Q 1/2266

USPC ................... 455/575.7, 575.1, 90.3; 343/701
See application file for complete search history.

(56) References Cited

U.S. PATENT DOCUMENTS

| | | | | |
|---|---|---|---|---|
| 7,129,906 | B2* | 10/2006 | Yoneya | H01Q 1/1207 343/872 |
| 8,866,692 | B2* | 10/2014 | Vazquez | H01Q 1/2291 343/702 |
| 2002/0053974 | A1* | 5/2002 | Beken | B63B 22/003 340/539.1 |
| 2010/0085255 | A1* | 4/2010 | Wakabayashi | H01Q 1/243 342/359 |
| 2012/0293378 | A1* | 11/2012 | von Arbin | H01Q 1/243 343/702 |
| 2014/0266922 | A1 | 9/2014 | Jin et al. | |
| 2014/0291404 | A1* | 10/2014 | Matsuoka | G06K 7/10881 235/462.46 |
| 2017/0036617 | A1* | 2/2017 | Greggs | B60R 13/01 |
| 2017/0077603 | A1 | 3/2017 | Krogerus | |

(Continued)

OTHER PUBLICATIONS

Extended European search report of European Patent Application No. 18180990, from the European Patent office, dated Nov. 22, 2018.

*Primary Examiner* — Danh C Le

(74) *Attorney, Agent, or Firm* — Syncoda LLC; Feng Ma

(57) ABSTRACT

A terminal includes a metal frame body having: a top frame configured to receive a global positioning system (GPS) antenna; and a middle frame provided with a slot corresponding to the GPS antenna in position, wherein the top frame and the middle frame are electrically isolated from each other by a gap.

19 Claims, 6 Drawing Sheets

(56) References Cited

U.S. PATENT DOCUMENTS

2017/0271765 A1* 9/2017 An ........................... H01Q 5/30
2018/0076529 A1* 3/2018 Minard ................... H01Q 1/42

* cited by examiner

METAL FRAME BODY AND TERMINAL INCLUDING SAME

CROSS-REFERENCE TO RELATED APPLICATION

The present application claims priority to Chinese patent application No. 201710527568.2, filed Jun. 30, 2017, the disclosure of which is hereby incorporated by reference in its entirety.

BACKGROUND

Devices such as mobile phones with positioning functions are becoming more and more popular. Typically, these devices implement the positioning functions with global positioning system (GPS) receivers.

SUMMARY

The present disclosure relates generally to electronic devices, and more particularly to a metal frame body and a terminal including the metal frame body.

Various embodiments of the present disclosure provide a metal frame body and a terminal including the metal frame body. Energy efficiency of the positioning antenna can be significantly improved, thereby prolonging battery life of the mobile terminals.

In an aspect, a metal frame body is provided, including: a top frame configured to receive a global positioning system (GPS) antenna; and a middle frame provided with a slot corresponding to the GPS antenna in position, wherein the top frame and the middle frame are electrically isolated from each other by a gap.

In some embodiments, the slot has a first point on a first side of the middle frame; the slot is perpendicular to the first side; and the first side is one side adjacent to the gap, among four sides the middle frame.

In some embodiments, a projection of the first point on the first side is a projection of the GPS antenna on the first side.

In some embodiments, the slot has a length of m times a signal wavelength of the GPS antenna, m being a numerical value between ⅛ and ½.

In some embodiments, the top frame and the middle frame are disposed on a same plane; and the top frame is disposed above the middle frame to facilitate the GPS antenna transmitting or receiving signals.

In some embodiments, the GPS antenna is disposed on an upper portion of the top frame.

In some embodiments, the metal frame body is made of at least one of aluminum alloy, aluminum, or anodized aluminum.

In another aspect, a terminal is provided, including: a metal frame body according to claim 1; and a GPS antenna.

In some embodiments, the slot is configured to have a first end on a first side among four sides of the middle frame; the first side is adjacent to the gap; and the slot is perpendicular to the first side.

In some embodiments, a projection of the first end on the first side is a projection of the GPS antenna on the first side.

In some embodiments, the slot has a length of m times a signal wavelength of the GPS antenna, m being a numerical value between ⅛ and ½.

In some embodiments, the top frame and the middle frame are disposed on the same plane; and the top frame is disposed above the middle frame to facilitate the GPS antenna transmitting or receiving signals.

In some embodiments, the GPS antenna is disposed on an upper portion of the top frame.

In some embodiments, the metal frame body is made of at least one of aluminum alloy, aluminum, or anodized aluminum.

In another aspect, a mobile terminal is provided including: a positioning antenna; a metal frame body, including: a top frame configured to receive the positioning antenna; and a middle frame provided with a slot corresponding to the positioning antenna in position, wherein the top frame and the middle frame are electrically isolated from each other by a gap.

In some embodiments, the positioning antenna includes a global positioning system (GPS) antenna.

In some embodiments, the mobile terminal is one of a mobile phone, a tablet computer, or a portable positioning device.

In some embodiments, the gap includes at least one or an air gap or an insulating medium.

In some embodiments, the top frame and the bottom frame are removably coupled together.

In some embodiments, the positioning antenna is disposed on an upper portion of the top frame; the slot is configured to have a first end on a first side among four sides of the middle frame; the first side is adjacent to the gap; the slot is perpendicular to the first side; and a projection of the first end on the first side is a projection of the GPS antenna on the first side, such that an upper hemisphere efficiency for the positioning antenna to receive satellite signals is significantly improved.

At least one of the embodiments disclosed herein can have one or more of the following advantage: a slot is provided on the middle frame to increase the upper hemisphere efficiency and proportion of the GPS antenna, thereby improving the GPS positioning performance; an optimal length is provided to further improve the GPS positioning performance; the reliability of the GPS positioning is enhanced.

It should be understood that both the foregoing general description and the following detailed description are merely some examples of various embodiments and are not intended to limit the scope of the disclosure.

BRIEF DESCRIPTION OF THE DRAWINGS

The accompanying drawings referred to in the specification are a part of this disclosure and provide illustrative embodiments consistent with the disclosure and, together with the detailed description, serve to illustrate some embodiments of the disclosure.

DETAILED DESCRIPTION

Various embodiments of the present disclosure are described below with specific examples, and other advantages and effects of the present disclosure can be easily understood by those skilled in the field of technology from the contents disclosed in this specification. The following description refers to the accompanying drawings in which same numeral references in different drawings may represent the same or similar elements unless otherwise indicated. Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Various navigation systems allow terminal devices such as mobile phones to accurately determine their locations. Satellite-based navigation systems such as the Global Positioning System (GPS), the GLONASS, The Galileo positioning system, and the BeiDou Navigation Satellite System are widely adopted by mobile terminal devices for positioning.

Although the GPS system is used here and in various embodiments below as an example, those of ordinary skill in the art will recognize that other navigation or positioning systems can be employed by embodiments of the present disclosure.

In an example, GPS satellites are generally all in the direction of the zenith. Therefore, a smart mobile phone can have better GPS-based positioning if its GPS antenna has a higher upper hemisphere efficiency and upper hemisphere proportion (the ratio of the upper hemisphere efficiency to the total efficiency).

However, as a result of being currently restricted by the space of the mobile phone and stacking of components inside the mobile phone, it may be difficult to control the upper hemisphere of the GPS antenna for the mobile phone. The upper hemisphere efficiency may be lower because of low upper hemisphere proportion, even when the total efficiency of the antenna becomes higher.

Meanwhile, improvements in upper hemisphere characteristics of the GPS antenna can involve a change in field pattern of the antenna, which is generally difficult to achieve on the mobile phone, particularly the mobile phone with a metal frame body, because the metal frame body can shield the GPS signals or at least distort the electromagnetic field patterns around the GPS antenna.

Figure 1:
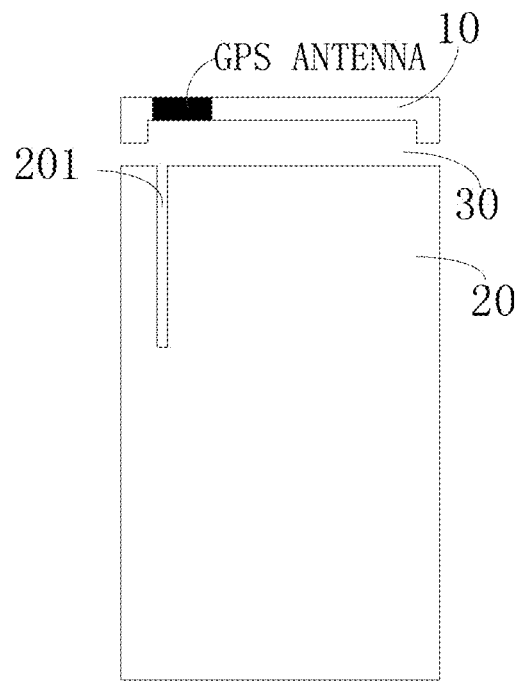
FIG. 1 is a schematic diagram illustrating a structure of a metal frame body according to some embodiments.

FIG. 1 is a block diagram illustrating a metal frame body according to some embodiments. The metal frame body can be part of a terminal, such as a mobile phone, a tablet computer, or a portable positioning device.

As shown in FIG. 1, the metal frame body includes: a top frame 10 configured to receive, or be fitted with, a positioning antenna such as a GPS antenna.

Herein, the GPS antenna is configured to receive satellite signals to enable the terminal to perform positioning or navigation. GPS satellite signals are classified into the L1 and L2 bands, with frequencies of about 1,575.42 MHZ and 1,228 MHZ, respectively.

L1 band is an open civil signal having a form of a circular polarization. The signal strength is around −166 DBM, i.e., relatively weak. Such L1 band characteristics determined that a special antenna has to be designed for receiving GPS signals. The GPS antenna according to some embodiments disclosed herein not only can receive GPS signals, but also may be compatible with other positioning systems, such as the BeiDou system.

According to some embodiments, a middle frame 20 is provided with a slot 201, which corresponds to the GPS antenna position.

In some embodiments, the slot 201 may change a ground current distribution on the middle frame 20. The middle frame is configured to anchor electronic components and physical press-keys of the mobile terminal.

The middle frame 20 can include four side frames, and a frame parallel to a display screen (not shown) of the mobile terminal and configured to anchor electronic components of the mobile terminal. The position of the GPS antenna is a position on the top frame for the GPS antenna when the mobile terminal is assembled.

The top frame 10 and the middle frame 20 can be electrically isolated from each other by a gap 30. In some embodiments, the gap 30 can be an air gap. In some other embodiments, the gap 30 can be filled with a medium such as an insulating material, e.g., plastic, rubber, resin, etc.

The gap 30 is a gap between the top frame 10 and the middle frame 20, such that the GPS antenna will not be directly affected by the electronic components on the middle frame 20.

In some other embodiments, the slot 201 in FIG. 1 can be provided on a side frame, and can be specifically provided depending on the position of the GPS antenna. It is noted that FIG. 1 provides a plan view showing an entire metal frame body, which includes side frames, in an exploded view.

In some embodiments, the gap 30 is provided on the middle frame 20 to increase the antenna upper hemisphere efficiency, and the upper hemisphere proportion of the GPS antenna, thereby improving the GPS positioning performance on the mobile terminal.

Figure 2:
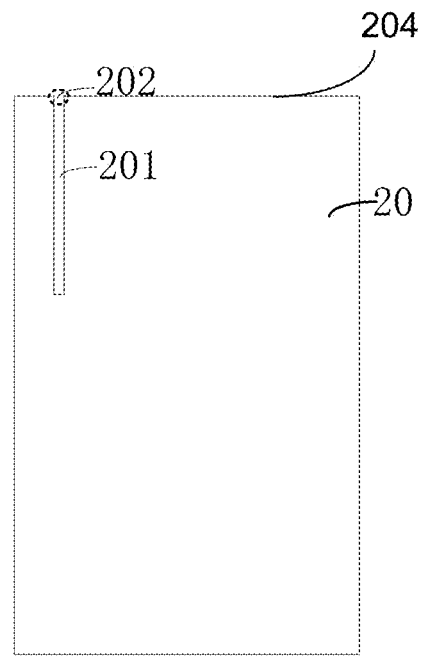
FIG. 2 is a schematic diagram illustrating a structure of a middle frame body according to some embodiments.

In some embodiments, as illustrated in FIG. 2, a slot 201 is formed such that it starts from a first end 202 on a first side 204 of the middle frame 20. The slot 201 is perpendicular to the first side, and the first side is one side adjacent to the gap 30, among the four sides of the middle frame 20.

Figure 3:
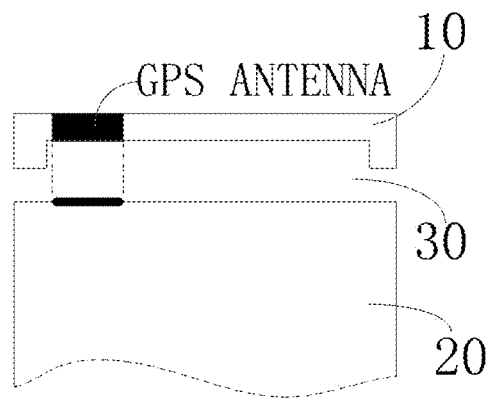
FIG. 3 is a schematic diagram illustrating a structure of a metal frame body according to some embodiments.

In some embodiments, as illustrated in FIG. 3, an area of a first end 202 on the first side 204 (shown in FIG. 2) of the middle frame 20 is also an area of a projection of the GPS antenna on the first side 204. The solid line in bold represents the area of the first end 202 on the first side 204.

Herein, two end points of the area of the first end 202 on the first side 204 of the middle frame 20 are respectively the two projection points of the two end points of the GPS antenna vertically projected onto the first side 204. The two end points of the GPS antenna are two boundary points of the GPS antenna along a direction of the first side 204.

In some embodiments, the slot 201 has a length m times that of the wavelength of a signal of the GPS antenna, wherein m has a numerical value between ⅛ and ½.

In some embodiments, the slot 201 has a length ¼ the wavelength of the signal of the GPS antenna, i.e., m=¼. The signal wavelength may be related to media surrounding the slot 204.

The frequencies of the signals of the GPS antenna may have a range. Correspondingly, the signal wavelengths and the length of the slot 201 may also have a range of values.

In some embodiments, the top frame 10 and the middle frame 20 are provided on a same plane. The top frame 10 can be disposed above the middle frame 20, to facilitate the GPS antenna transmitting and receiving signals.

Because GPS satellites generally are all in the direction of the zenith, the GPS antenna is disposed on an upper extremity of the entire mobile terminal according to some embodiments. Herein, the "top" or "upper" portion refers to the top position with respect to a user's viewing the screen from top to bottom of the mobile terminal, or holding the mobile terminal with the upper portion (e.g., the GPS antenna) pointing upwards toward the general direction of the sky.

In some embodiments, the GPS antenna is disposed on an upper portion of the top frame 10.

In some embodiments, the GPS antenna is disposed above all the electronic components of the mobile terminal. Because the top frame 10 is disposed above the middle frame 20, the GPS antenna is ensured to be disposed on top of all the electronic components if the GPS antenna is disposed on the upper portion of the top frame 10. As such, shielding and interference from the electronic components can be reduced.

In some embodiments, the material of the metal frame body includes at least one of aluminum alloy, aluminum, or anodized aluminum.

Figure 4:
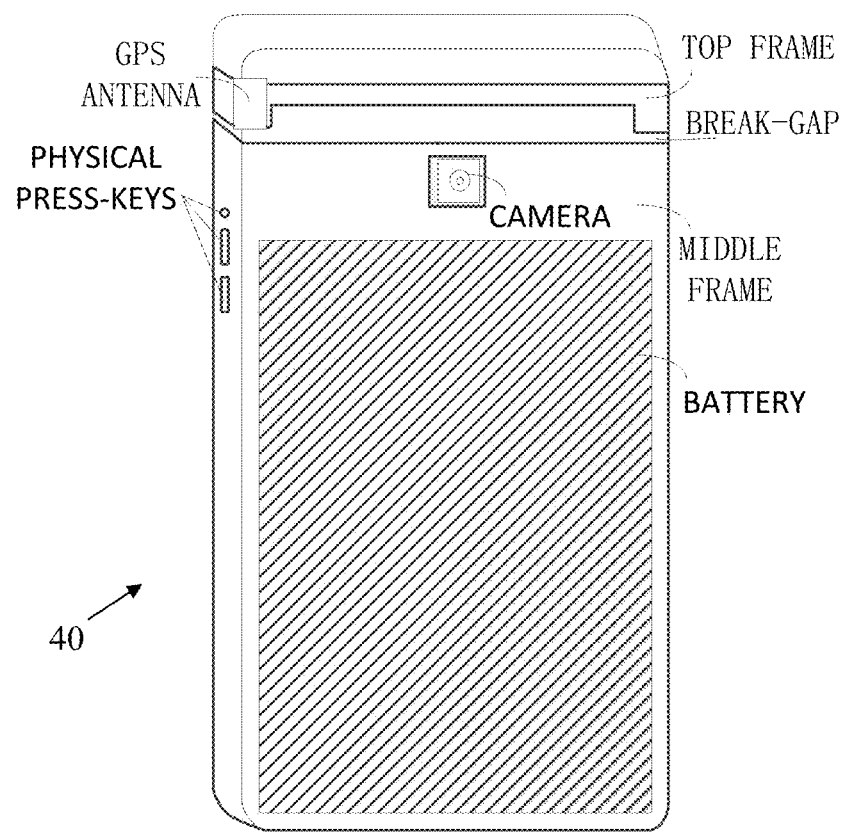
FIG. 4 is a schematic diagram illustrating a structure of a terminal according to some embodiments.

In some embodiments, as shown in FIG. 4, a terminal 40 is provided. The terminal 40 can include a metal frame body described above, and a GPS antenna.

The metal frame body can include: a top frame configured to receive the GPS antenna; a middle frame provided with a slot, the slot corresponding to the GPS antenna in position. The top frame and the middle frame are electrically isolated from each other by a gap.

In some embodiments, the top frame and the middle frame are removably coupled together through a mechanical structure such as one or more protrusions and indentations. The top frame and the middle frame can therefore be coupled together, or decoupled to give access to some components of the mobile terminal 40.

In some other embodiments, the top frame and the middle frame are fixedly coupled together. For example, the top frame and the middle frame can be glued together.

Electronic components disposed on the middle frame may include many types of electronic components, electrical circuits, or other device portions, such as a battery, a camera, and physical press-keys.

A comparison can be made between different configurations of the GPS antenna disposed on a metal frame body.

Figure 5A:
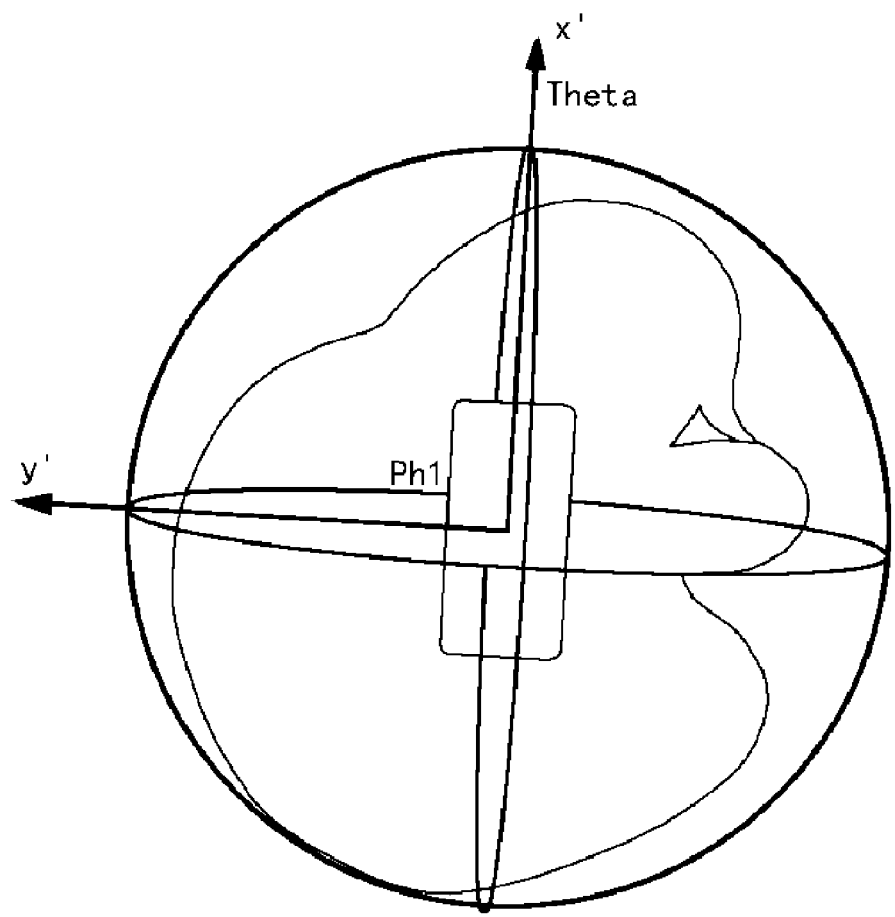
FIG. 5A is a graph showing a position of a terminal under the condition of a metal frame body for comparison.

FIG. 5A is a graph showing a position of a mobile terminal with a metal frame body according to one configuration for comparison. The z' direction is the "up" direction in the 3-D coordinate system shown in FIG. 5A. A field distribution is also illustrated.

Figure 5B:
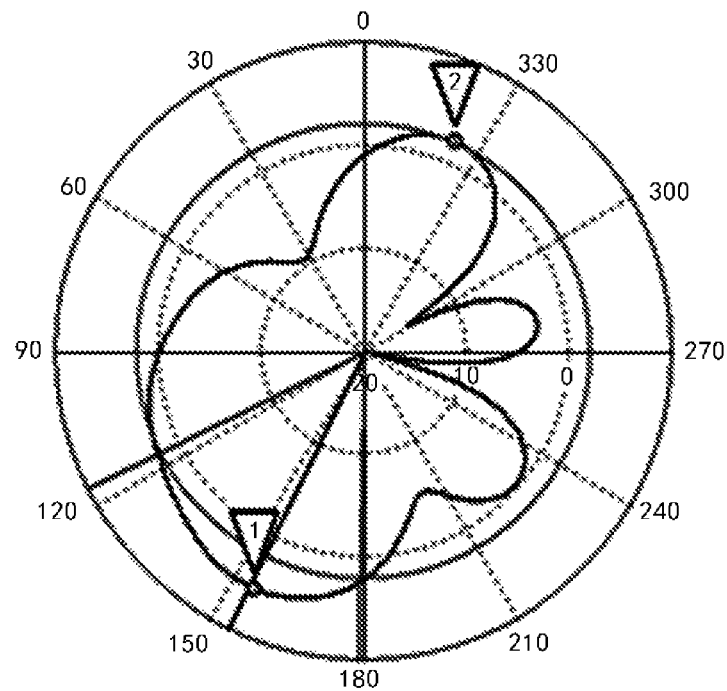
FIG. 5B is a graph showing a simulation result of circular polarization of a GPS antenna under the condition of a metal frame body for comparison.

FIG. 5B is a graph showing a simulation result of circular polarization of the GPS antenna in the configuration illustrated in FIG. 5A.

Figure 5C:
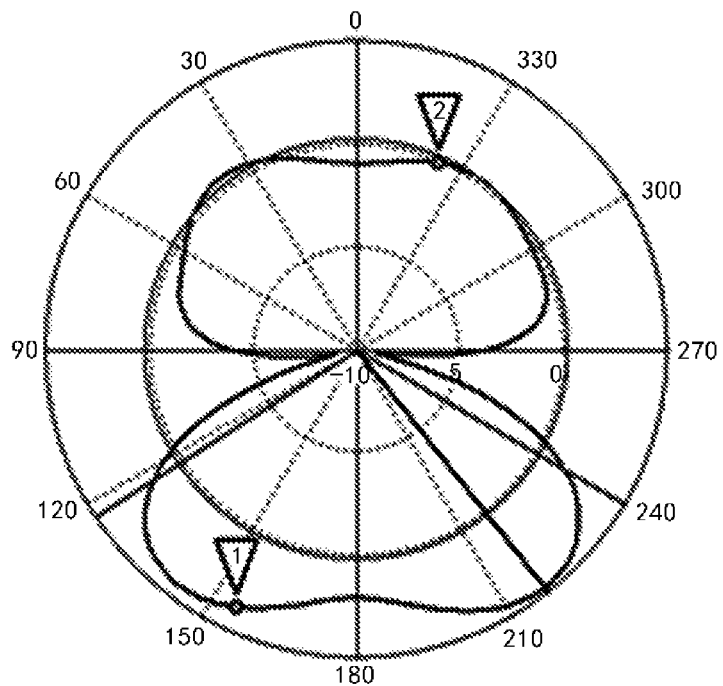
FIG. 5C is a graph showing a simulation result of circular polarization of a GPS antenna with a phase difference of 90 degrees under the condition of a metal frame body for comparison.

FIG. 5C is a graph showing a simulation result of circular polarization of the GPS antenna with a phase difference of 90 degrees in the configuration illustrated in FIG. 5A.

Figure 6A:
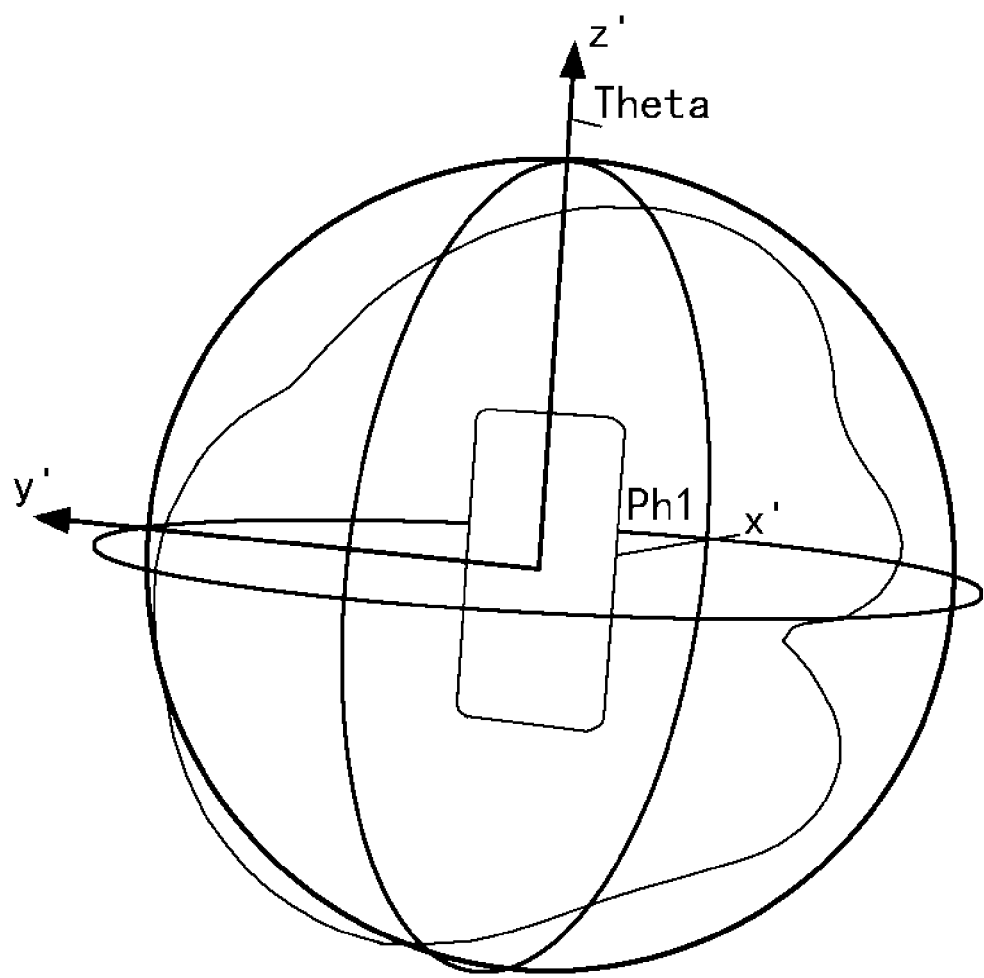
FIG. 6A is a graph showing a position of a terminal under the condition of a metal frame body according to some embodiments.

FIG. 6A is a graph showing a position of a mobile terminal with a metal frame body according to some embodiments in a 3D electromagnetic environment, with an orientation in the 3-D coordinate system similar to those of FIG. 5A.

Figure 6B:
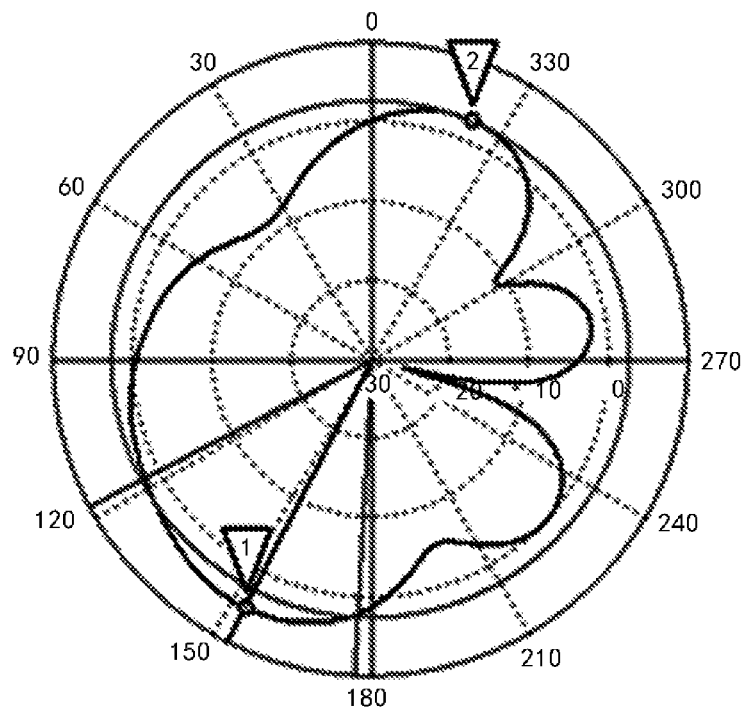
FIG. 6B is a graph showing a simulation result of circular polarization of a GPS antenna under the condition of a metal frame body according to some embodiments.

FIG. 6B is a graph showing a simulation result of circular polarization of the GPS antenna in the configuration of FIG. 6A.

Figure 6C:
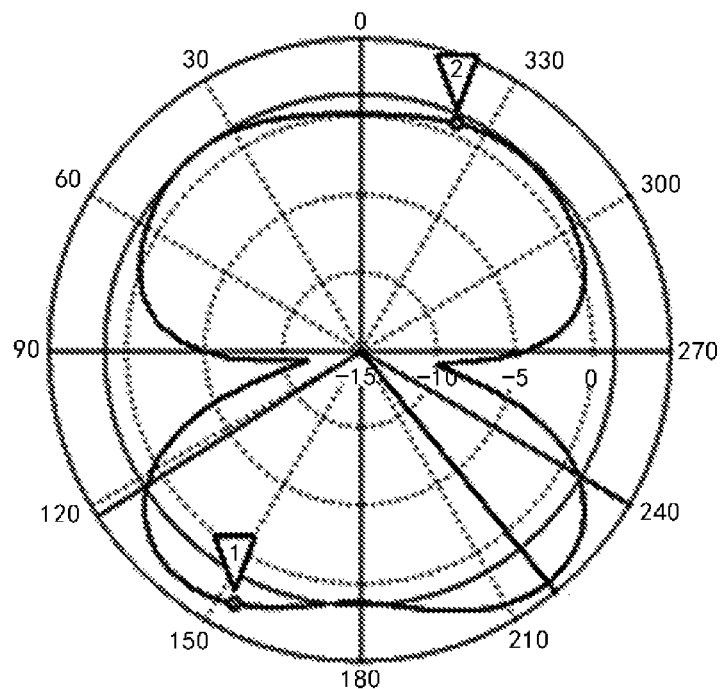
FIG. 6C is a graph showing a simulation result of circular polarization of a GPS antenna with a phase difference of 90 degrees under the condition of a metal frame body according to some embodiments.

FIG. 6C is a graph showing a simulation result of circular polarization of the GPS antenna with a phase difference of 90 degrees in the configuration of FIG. 6A.

Table 1 compares the results from the two different configurations.

TABLE 1

| The GPS antenna | Improvement in the total efficiency | The upper hemisphere efficiency | Delta | The upper hemisphere proportion |
|---|---|---|---|---|
| Comparison configuration shown in FIG. 5A | −5.2 | −9.9 | −4.7 | 34% |
| Configuration shown in FIG. 6A | −4.54 | −8.55 | −4.0 | 40% |

As can be seen, the metal frame body according to some embodiments of the present disclosure can improve the total efficiency of the GPS antenna by 0.7 dB, the upper hemisphere efficiency by 1.4 dB, and the upper hemisphere proportion by 0.7 dB (e.g., the upper hemisphere proportion is increased from 34% to 40%).

According to some embodiments, the significant improvements result from the difference in the GPS antenna configurations. For example, FIG. 5C shows a field pattern of the GPS antenna of the mobile terminal with a metal frame body according to the comparison configuration without the top frame and the bottom frame configuration illustrated in FIGS. 1-4, and FIG. 6C shows a field pattern of the GPS antenna of the mobile terminal with a metal frame body according to some embodiments disclosed herein and illustrated in FIGS. 1-4.

The figures are plotted under the same conditions where the signal frequency is 2.1 MHZ, the main lobe direction is of 154 degrees, and the phase difference in each of two circular polarization graphs of FIGS. 5C and 6C is 90 degrees.

As can be seen, the ratio of the maximum value of the front lobe to that of the back lobe (F/B) is 3.3 as shown in the case of FIG. 5C, while F/B is 2.5 in the case of FIG. 6C. Therefore, the upper hemisphere of the GPS antenna significantly improves, and the F/B is improved by 0.8.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An apparatus including a metal frame body, comprising:
   a top frame having a global positioning system (GPS) antenna disposed thereon; and
   a middle frame provided with a slot corresponding to the GPS antenna in position,
   wherein the top frame and the middle frame are electrically isolated from each other by a gap; and wherein:
   the GPS antenna is disposed on an upper portion of the top frame;
   the slot has a first end on a first side among four sides of the middle frame;
   the first side is adjacent to the gap;
   the slot is perpendicular to the first side; and
   a projection of the first end on the first side is a projection of the GPS antenna on the first side,
   such that an upper hemisphere efficiency for the positioning antenna to receive satellite signals is significantly improved.

2. The apparatus including the metal frame body of claim 1, wherein:
   the slot has a first point on a first side of the middle frame;
   the slot is perpendicular to the first side; and
   the first side is one side adjacent to the gap, among four sides the middle frame.

3. The apparatus including the metal frame body of claim 2, wherein a projection of the first point on the first side is a projection of the GPS antenna on the first side.

4. The apparatus including the metal frame body of claim 1, wherein the slot has a length of m times a signal wavelength of the GPS antenna, m being a numerical value between ⅛ and ½.

5. The apparatus including the metal frame body of claim 1, wherein:
   the top frame and the middle frame are disposed on a same plane; and
   the top frame is disposed above the middle frame to facilitate the GPS antenna transmitting or receiving signals.

6. The apparatus including the metal frame body of claim 1, wherein the GPS antenna is disposed on an upper portion of the top frame.

7. The apparatus including the metal frame body of claim 1, wherein the metal frame body is made of at least one of aluminum alloy, aluminum, or anodized aluminum.

8. A terminal comprising the apparatus according to claim 1, comprising:
   the metal frame body according to claim 1; and
   the GPS antenna.

9. The terminal of claim 8, wherein:
   the slot has a first end on a first side among four sides of the middle frame;
   the first side is adjacent to the gap; and
   the slot is perpendicular to the first side.

10. The terminal of claim 9, wherein a projection of the first end on the first side is a projection of the GPS antenna on the first side.

11. The terminal of claim 8, wherein the slot has a length of m times a signal wavelength of the GPS antenna, m being a numerical value between ⅛ and ½.

12. The terminal of claim 8, wherein:
    the top frame and the middle frame are disposed on the same plane; and
    the top frame is disposed above the middle frame to facilitate the GPS antenna transmitting or receiving signals.

13. The terminal of claim 8, wherein the GPS antenna is disposed on an upper portion of the top frame.

14. The terminal of claim 8, wherein the metal frame body is made of at least one of aluminum alloy, aluminum, or anodized aluminum.

15. A mobile terminal comprising:
    a positioning antenna;
    a metal frame body, comprising:
    a top frame having the positioning antenna disposed thereon; and
    a middle frame provided with a slot corresponding to the positioning antenna in position,
    wherein the top frame and the middle frame are electrically isolated from each other by a gap; and wherein:
    the positioning antenna is disposed on an upper portion of the top frame;
    the slot has a first end on a first side among four sides of the middle frame;
    the first side is adjacent to the gap;
    the slot is perpendicular to the first side; and
    a projection of the first end on the first side is a projection of the GPS antenna on the first side,
    such that an upper hemisphere efficiency for the positioning antenna to receive satellite signals is significantly improved.

16. The mobile terminal of claim 15, wherein the positioning antenna comprises a global positioning system (GPS) antenna.

17. The mobile terminal of claim 15, wherein the mobile terminal is one of a mobile phone, a tablet computer, or a portable positioning device.

18. The mobile terminal of claim 15, wherein the gap comprises at least one or an air gap or an insulating medium.

19. The mobile terminal of claim 15, wherein the top frame and the bottom frame are removably coupled together.

* * * * *